United States Patent
Harris et al.

(10) Patent No.: US 11,188,966 B1
(45) Date of Patent: Nov. 30, 2021

(54) CATALOG ENABLEMENT DATA FOR SUPPLIER SYSTEMS BASED ON COMMUNITY ACTIVITIES

(71) Applicant: Coupa Software Incorporated, San Mateo, CA (US)

(72) Inventors: Scott Harris, Menlo Park, CA (US); Vincent Toesca, San Francisco, CA (US); Prasanna Kumar, Saratoga, CA (US); Amit Vijayant, San Jose, CA (US)

(73) Assignee: Coupa Software Incorporated, San Mateo, CA (US)

( * ) Notice: Subject to any disclaimer, the term of this patent is extended or adjusted under 35 U.S.C. 154(b) by 165 days.

(21) Appl. No.: 16/563,615

(22) Filed: Sep. 6, 2019

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0201* (2013.01); *G06Q 30/0603* (2013.01)

(58) Field of Classification Search
CPC ........... G06Q 30/0631; G06Q 30/0201; G06Q 30/0603
See application file for complete search history.

(56) References Cited

U.S. PATENT DOCUMENTS

| | | | |
|---|---|---|---|
| 10,839,389 B1 * | 11/2020 | Cron, Jr. | G06N 5/025 |
| 2003/0204467 A1 * | 10/2003 | Kartha | G06Q 30/08 705/37 |
| 2009/0163183 A1 * | 6/2009 | O'Donoghue | G06Q 30/02 455/414.1 |
| 2012/0290678 A1 * | 11/2012 | Dawson | G06Q 10/06 709/217 |
| 2013/0166415 A1 * | 6/2013 | Odenheimer | G06Q 10/087 705/26.62 |
| 2017/0161809 A1 * | 6/2017 | Dubey | G06F 16/24578 |
| 2018/0211297 A1 * | 7/2018 | Shilo | G06F 16/367 |
| 2019/0172075 A1 * | 6/2019 | Kenkre | G06Q 50/01 |

OTHER PUBLICATIONS

Linden, Greg, Brent Smith, and Jeremy York. "Amazon. com recommendations: Item-to-item collaborative filtering." IEEE Internet computing 7.1 (2003): 76-80.*
U.S. Appl. No. 16/510,978, filed Jul. 15, 2019.

* cited by examiner

*Primary Examiner* — Kathleen Palavecino
(74) *Attorney, Agent, or Firm* — Baker Botts L.L.P.

(57) ABSTRACT

A method and apparatus for generating recommendation data for cataloging items in an e-procurement system is provided. In various embodiments, a database of records is created and maintained corresponding to a plurality of transactions in an e-procurement system. In various embodiments, database records are weighted and sorted according a transaction method associated with the records. In various embodiments, recommendation data is generated for items associated with the records to suggest more efficient methods for offering items for procurement in an e-marketplace based on the weights and sort order of the records.

20 Claims, 10 Drawing Sheets

FIG. 4

| Data Repository 140 | | | |
|---|---|---|---|
| Transaction No. | Date | Item Code | Transaction Type |
| #000112234 | 06.25.2019 | Sunglasses | Free-Form |
| #000112235 | 06.25.2019 | Lounge Chairs | Free-Form |
| #000112236 | 06.26.2019 | Parasol | Catalog |
| #000112237 | 06.26.2019 | Parasol | Catalog |
| #000112238 | 06.26.2019 | Sunglasses | Free-Form |
| #000112239 | 06.29.2019 | Appliance Cleaner | Free-Form |
| #000112240 | 06.29.2019 | Chlorine Refill | Catalog |
| #000112241 | 06.29.2019 | Sunglasses | Free-Form |
| #000112242 | 06.30.2019 | Beach Towel - Blue | Punch-Out |
| #000112243 | 06.30.2019 | Lounge Chairs | Free-Form |
| #000112243 | 07.01.2019 | Beach Towel - Red | Punch-Out |

Catalog Recommendation Layer 150

| Item Code | Total Transaction Count | 30 Day Transaction Count |
|---|---|---|
| Sunglasses | 84 | 32 |
| Lounge Chairs | 46 | 17 |
| Aquanaut Cleaner | 32 | 15 |
| Handheld Vacuum | 18 | 3 |
| Prescription Goggles | 9 | 1 |
| Bug Spray | 3 | 1 |
| Water Filter | 3 | 0 |
| Potpourri | 2 | 0 |
| Snorkel Fins | 2 | 1 |
| AAA Batteries | 1 | 0 |
| Metal Detector | 1 | 0 |

FIG. 6

Catalog Recommendation Layer 150 — 510

| Item Code | Spend Level | Profit Made |
|---|---|---|
| Aquanaut Cleaner | $12,799.68 | $3,598.47 |
| Lounge Chairs | $8,280.00 | $4,255.76 |
| Sunglasses | $3,359.16 | $1,134.92 |
| Handheld Vacuum | $871.70 | $512.02 |
| Prescription Goggles | $142.17 | $34.09 |
| Water Filter | $100.22 | $33.90 |
| Metal Detector | $99.99 | $50.01 |
| Snorkel Fins | $42.98 | $14.98 |
| Bug Spray | $16.29 | $5.11 |
| Potpourri | $12.96 | $9.14 |
| AAA Batteries | $6.99 | $1.00 |

620 — Profit Made
630(1), 630(n)
500

FIG. 7

| Item Code | Total Transaction Count | 30 Day Transaction Count |
|---|---|---|
| Sunglasses | 84 | 32 |
| Lounge Chairs | 46 | 17 |
| Aquanaut Cleaner | 32 | 15 |
| Handheld Vacuum | 18 | 3 |
| Prescription Goggles | 9 | 1 |
| Bug Spray | 3 | 1 |
| Water Filter | 3 | 0 |
| Potpourri | 2 | 0 |
| Snorkel Fins | 2 | 1 |
| AAA Batteries | 1 | 0 |

Catalog Recommendation Layer 150

CATALOG ENABLEMENT DATA FOR SUPPLIER SYSTEMS BASED ON COMMUNITY ACTIVITIES

FIELD OF THE DISCLOSURE

One technical field of the present disclosure is computer-implemented processes of maintaining and updating data for transactional search results and purchase data to generate recommendations. Another technical field is computer-implemented product catalog and punch-out systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

E-procurement technologies may relate to any digital or electronic marketplace or e-marketplace whereby buyer accounts or buyer computers and supplier accounts or supplier computers interact to participate in the exchange of digital data relating to tangible goods or services. E-procurement may involve networked interaction between buyer accounts or buyer computers and seller accounts or seller computers or may involve one or more intermediary parties. For example, procurement may refer to a process whereby a buyer account or buyer computer submits a purchase order through an employing entity who will approve the transaction and purchase at item from a seller account or seller computer. Such procurements may utilize a third-party intermediary or application to allow communication between buyer accounts or buyer computers and seller accounts or seller computers to facilitate efficient e-procurements.

Businesses including buyer accounts or buyer computers which utilize e-procurement technologies constantly seek to enhance the efficiency of such digital transactions, in terms of use of computer resources such as CPU cycles, storage, memory and network bandwidth, by improving the methods with which items are searched for and procured. Supplier and distributor entities constantly seek to enhance digital transactions by improving the methods with which supplier accounts or supplier computers make items available and process transactions. Both parties benefit from improvements to the e-marketplace, the digital platform by which both entities facilitate such interactions. However, solutions for the problems of one entity may upset the balance of efficiency in the marketplace for other entities operating in the e-procurement space.

For example, the ability to find general and especially highly specific items for buyer accounts or buyer computers in an e-procurement marketplace with a minimal amount of electronic searching is a valuable and important step in the e-procurement process. Attempting to saturate the e-marketplace with every item a seller account or computer offers means there are more items a buyer accounts or buyer computers must parse through manually in the e-marketplace, and more space must be taken up on electronic server memory in the e-marketplace to offer each item. The buyer accounts or buyer computers are likely to become resource constrained when choosing between a larger number of available items and waste valuable time. Supplier accounts and supplier computers consequently must take greater care to maintain and ensure the viability of each listed item.

On the other hand, by restricting the number of items available from a supplier account or supplier computer on the e-marketplace, search and query results may be fulfilled more quickly, but highly specific items sought by buyer accounts or buyer computers may not be available or may not be readily noticeable on the e-marketplace. As a result, buyer accounts or buyer computers may contact a supplier account or supplier computer outside of traditional e-marketplace channels to query data about or request an item for procurement, attempt to find the item using alternative means on the e-marketplace, or attempt to procure the item from one of the supplier's competitors.

This tug-of-war problem with item supply in an e-marketplace remains a highly subjective and difficult problem to navigate for buyers and suppliers alike. One solution that suppliers have attempted to fix these issues is the use of digital catalogs. Catalogs may be any grouping of items available through the supplier account or computer according to some criteria. Many transactions have historically been performed through free-form procurements, which are procurements performed according to informal channels, such as in-person bartering, phone or money orders, or unorganized online/e-marketplace purchases. Catalog groupings make items more readily available to buyers for procurement with that added benefit that items included in a catalog are often related to other incidental items buyer accounts or buyer computers are more likely to purchase from the same catalog. As a result, buyer accounts or buyer computers find items more quickly, sellers sell more items, and e-procurement services benefit from increased commercial traffic, and may improve pricing or buying conditions for items hosted on the service Catalog-based procurements are typically more efficient than less organized methods including free-form procurements for these reasons.

However, catalogs use is still subject to the same problems with item saturation described above. Catalogs which are compact for the convenience of a buyer may still be incomplete if frequently requested, searched, and purchased items are not available in a proper corresponding catalog. As a result, suppliers may be inundated with inefficient procurement requests outside of the e-marketplace, such as free-form procurements, or may miss requests altogether. In order to prevent such occurrences without saturating existing catalogs by including every available item that a buyer may request to procure, suppliers must know which items can most efficiently be included in a catalog and which cannot, in order to implement efficient e-marketplace procedures.

What is therefore needed in the art is a digital record management and recommendation system which can analyze existing and expected e-marketplace data for searches, requests, and transactions in order to deduce some relative importance of cataloging a certain item. Digital transactions and e-procurement technologies in particular will greatly benefit from a method of determining relative importance of certain items offered for sale by a supplier and editing digital catalogs and offer procedures based on such findings. Technology which can allow suppliers to offer optimized catalogs for buyer accounts or buyer computers will improve the e-marketplace by eliminating the unnecessary use of computer memory corresponding to items of lesser importance while drastically improving the e-procurement process by making an optimal number of sought items readily searchable and procurable through proper catalogs.

SUMMARY

The appended claims may serve as a summary of the invention.

BRIEF DESCRIPTION OF THE DRAWINGS

In the drawings:

FIG. 4 is an illustrative representation of a database collection of e-procurement records corresponding to various embodiments.

FIG. 6 is an illustrative representation of a database collection of a sorted subset of e-procurement records corresponding to various embodiments.

FIG. 7 is an illustrative representation of a database collection of a sorted subset of e-procurement records further divided into multiple sub-subsets of data corresponding to various embodiments.

DETAILED DESCRIPTION

Figure 1:
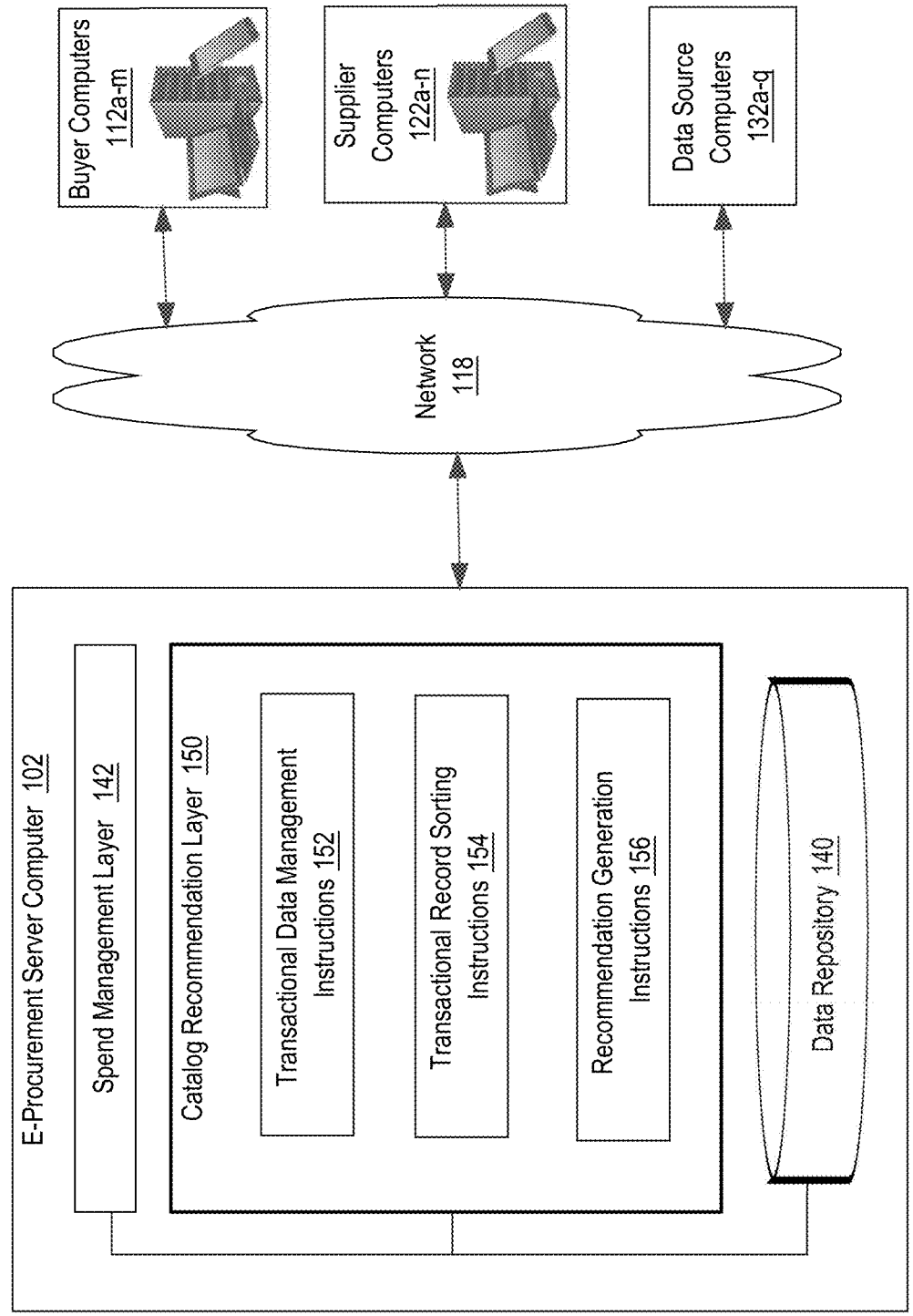
FIG. 1 illustrates an example networked computer system with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In various embodiments, a computer-implemented method is utilized to generate recommendation data for presentation to supplier accounts or supplier computers participating in a digital transactional e-marketplace in order to optimize the method by which the supplier account or supplier computer presents items for e-procurement to buyer accounts or buyer computers. Suppliers may be any kind of entity which offers items for sale or procurement in an e-marketplace.

The computer-implemented method may be utilized to create and store a plurality of records in the database. The records correspond to historical transactions recorded and represent e-procurement processes between buyer accounts or buyer computers and supplier accounts or supplier computers in the e-marketplace. The stored records therefore represent the amalgamated data of e-procurements for a number of buyer accounts or buyer computers and number of supplier accounts or supplier computers involving a number of items.

The computer-implemented method may be utilized to determine a first subset of records from among the stored records which correspond to transactions performed by a particular transactions process. For example, the method may be programmed to group distinct transactions into several categories, such as catalog-based and non-catalog-based transactions. As a further example, the method may single out and group records which involve free-form procurements of items directly from a seller, as opposed to procurements performed via catalog-based procurement processes.

The computer-implemented method may be utilized to determine a weight value or some kind of metric for each record in the first subset of records, effectively ordering them according to a criteria which is efficient for the buyer accounts or buyer computers or supplier accounts or supplier computers. For example, from among the first subset of records which involve only transactions corresponding to free-form e-procurement methods, the computer-implemented method may assign a weight metric to each record corresponding to the relative number of similar records to that record in the determined first subset of records. Records having higher instances of similar records also being stored in the first subset of records will have higher weight values than records corresponding to transactions which are largely performed in isolation or very infrequently.

The computer-implemented method may be utilized to sort the first subset of records according to the weight values or metrics previously determined. For example, a hierarchy of records may be created specifying the relative importance or weight of each record in the first subset of records.

The computer-implemented method may be utilized to generate, based on the sorted records, recommendation data which specifies one or more recommended items which may associate with a second transaction process which is different than the first transaction process. For example, items with a higher weight, and therefore more occurrences of free-form procurements, may fit better into a catalog from the supplier. Based on the weighted records which are now sorted, a number of records may be chosen from the top of the hierarchy. Items associated with those records may be identified and a recommendation to a supplier may be sent specifying which items would benefit from cataloging.

All embodiments disclosed and claimed herein are directed to computer-implemented programmed processes that interact with digital data and perform calculations to cause transformations to other digital data and other ancillary technical effects. The disclosure is not intended to encompass techniques for organizing persons or for performing mental acts or steps, and any interpretation of the claims to encompass such techniques would be unreasonable based upon the disclosure as a whole. Embodiments address the technical problem of how to eliminate or reduce repeated or needless electronic communications that are otherwise required when manual recommendations for supplier catalogs are made. Specific problems of prior practice have included wasteful use of computer processing resources, such as CPU usage and memory, as well as network bandwidth. The solutions disclosed herein can improve supplier recommendations for catalogs by providing an automatic and ongoing recommendation process to improve supplier catalogs without the need to facilitate needless and inefficient communication between a supplier and a marketplace facilitator. Consequently, the disclosed techniques provide numerous technical benefits. One example is reduced use of memory, CPU cycles, and other computer resources, resulting in improved machine efficiency, for all the reasons set forth herein. Further, while the disclosure provides for programmed, applied processes using computers, those processes are directed to improvements in another technical field of technology, namely e-procurement.

2. Example Computing Environments and Computer Components

FIG. 1 illustrates an example networked computer system with which various embodiments may be practiced. FIG. 1 is shown in simplified, schematic format for purposes of illustrating a clear example and other embodiments may include more, fewer, or different elements.

In some embodiments, the networked computer system comprises an e-procurement server computer 102 ("server"), one or more supplier computers 122*a-n*, one or more buyer computers 112*a-m*, and one or more data source computers 132, which are communicatively coupled directly or indirectly via one or more networks 118. The designation n for reference numeral 122 and m for reference numeral 112 indicates that any number of supplier computers or buyer computers may be used in an embodiment, and n and m have no fixed maximum value.

In some embodiments, the server 102 broadly represents one or more computers, such as a server farm, a cloud computing platform, or a parallel computer, virtual computing instances, and/or instances of a server-based application. The server 102 comprises a spend management layer 142 that is programmed or configured to host or execute functions including but not limited to managing buyer accounts associated with the one or more buyer computers 112*a-m* and supplier accounts associated with the one or more supplier computers 122*a-n*, and facilitating generation and maintenance of digital documents during procurement transactions between buyer accounts and supplier accounts, such as catalogs, purchase requisitions, purchase orders, or invoices. The server 102 also comprises a catalog recommendation layer 150 that is programmed or configured to host or execute functions including but not limited to generating a catalog modification recommendation for a supplier account and modifying a catalog on supplier computer 122*a* which may become available to a buyer computer 112*a* of the buyer account.

FIG. 1 also illustrates example components of the server 102 in accordance with the disclosed embodiments. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the catalog recommendation layer 150 can comprise computer-executable instructions, including transactional data management instructions 152, transactional record sorting instructions 154, and recommendation generation instructions 156. In addition, the server 102 can comprise a database module 140.

In some embodiments, the transactional data management instructions 152 enable collecting and transmitting transactional data or documents, such as catalogs, purchase requisitions, purchase orders, or invoices, between supplier computers and buyer computers and maintaining the transactional data in memories. Specifically, the transaction data management instructions 152 enable managing the transactional data by semantic units, such as individual item descriptions or prices. For example, a catalog retrieved from a supplier computer can be parsed into these semantic units, or a graphical user interface can be presented for entering or selecting such semantic units in generating a purchase requisition. Additional metadata that may not be part of the transactional data can also be stored with the transactional data, such as the date of creation or the list of accounts accessing the transactional data.

In some embodiments, the transactional record sorting instructions 154 enable analyzing transactional data and ordering or organizing transactional records in order to more efficiently generate recommendation data. Specifically, the transactional record sorting instructions 154 enable the parsing of historical or expected transactional records according to various criteria which may be used in the recommendation. After parsing occurs, the transactional record sorting instructions 154 may cause a sorting of the transactional records in some order corresponding to weights or attributes sorted in the data. The transactional record sorting instructions 154 further enable the partitioning or separation of data into subsets of data. This partitioning may be done subsequent to the sorting process, after which the transactional record sorting instructions will create distinct subsets of data according to the manner in which the data was sorted.

In some embodiments, the recommendation generation instructions 156 enable the generation of data representing a recommendation that will be sent to a supplier account or supplier computer 112*a*. These recommendations may include the manner in which the parsed data of transactional records has been sorted, the resulting subsets of partitioned data, the results of creating a specific subset, or displaying a possible catalog or requisition medium which can be made using the data.

In some embodiments, the database module 140 is programmed or configured to manage relevant data structures and store relevant data for functions performed by the server 102. In association with the catalog recommendation layer 150, the data may include supplier data, buyer data, transactional data including terms of early payment discounts, trends of prices or charges, previously recorded transactions, pending transactions, expected future transactions, or trends observed or expected according to transactional records.

In some embodiments, each of the buyer computers 112*a-m* broadly represents one or more computers, virtual computing instances, and/or instances of an e-procurement application program that are associated with an institution or entity that is related as a buyer with respect to a separate entity associated with one of the supplier computers 122*a-n*. A buyer computer 112*a* is programmed to create a buyer account with the server 102 and manage digital documents related to a buyer account during procurement transactions, such as receiving a catalog of items for sale from the server 102, generating or transmitting a purchase requisition or purchase order for some of the items for sale to the server 102, or receiving an invoice for some of the items for sale from the server 102. The buyer computer 112*a* may comprise a desktop computer, laptop computer, tablet computer, smartphone, wearable device, or any other type of computing device that is capable of proper communication with the server 102 as well as adequate local data processing and storage. In some cases, a buyer computer 112a may be a personal computer or workstation that hosts or executes a browser and communicates via HTTP and HTML over the network 118 with a server-side e-procurement application hosted or executed at the server 102. In other cases, a buyer computer 112a may be a server-class computer and/or virtual computing instance that hosts or executes an instance of an e-procurement application that communicates programmatically via API calls, RPC or other programmatic messaging with the server 102.

Similarly, in some embodiments, each of the supplier computer 122a-n broadly represents one or more computers, virtual computing instances, and/or instances of an e-procurement application program that are associated with an institution or entity that is related as a supplier with respect to a separate entity associated with one of the buyer computer 112a-m. A supplier computer 122a is programmed to create a supplier account with the server 102 and manage digital documents related to a supplier account during procurement transactions, such as generating or transmitting a catalog of items for sale to the server 102, receiving a purchase order for some of the items for sale from the server 102, or generating or transmitting an invoice for some of the items for sale to the server 102. A supplier computer 122a may comprise a desktop computer, laptop computer, tablet computer, smartphone, wearable device, or any other type of computing device that is capable of proper communication with the server as well as adequate local data processing and storage. In some cases, a supplier computer 122a may be a personal computer or workstation that hosts or executes a browser and communicates via HTTP and HTML over network 118 with a server-side e-procurement application hosted or executed at the server 102. In other cases, a supplier computer 122a may be a server-class computer and/or virtual computing instance that hosts or executes an instance of an e-procurement application that communicates programmatically via API calls, RPC or other programmatic messaging with the server 102.

In some embodiments, each of the data source computer 132a-q broadly represents one or more computers, virtual computing instances, and/or instances of a data management application program with a communication interface. A data source computer 132a is programmed to manage one or more data sources, receive a request for certain data in the one or more data sources from the server 102, and send a response to the request to the server 102. The data source computer 132a can comprise any computing facility with sufficient computing power in data processing, data storage, and network communication for the above-described functions.

In some embodiments, the network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, through the catalog recommendation layer 150, the server 102 is programmed to receive or transmit transactional data, such as catalogs, purchase requisitions, purchase orders, or invoices, from or to the buyer computers 112a-m or the supplier computers 122a-n. In other embodiments, the server 102 is programmed to receive or transmit additional transactional data, such as expense reports, from or to one of the buyer computers 112a-112m representing an organization and another one of the buyer computers 112a-112m representing an entity, and similarly from or to one of the supplier computers 122a-112n representing an organization and another one of the supplier computers 122a-122n representing an entity. The server 102 is programmed to also store such transactional data in association with the appropriate accounts in a storage device, such as the data repository 140. Such transactional data may include terms of an early payment discount offered by a supplier account to a buyer account. The server 102 is programmed to further receive additional data from the data source computers 132a-q that can be used to assess the transactional data communicated between one of the supplier computer 122a-n and one of the buyer computers 112a-m. The additional data may include industry-wide prices of certain items sold by a supplier account or annual revenue or spending data associated with a buyer account. The server 102 is programmed to also store such additional data in a storage device, such as the data repository 140.

In some embodiments, periodic or manually programmed or initiated recommendations for catalog modifications may be made by the server 102 and sent to a supplier account.

3. Example Processes

Figure 2:
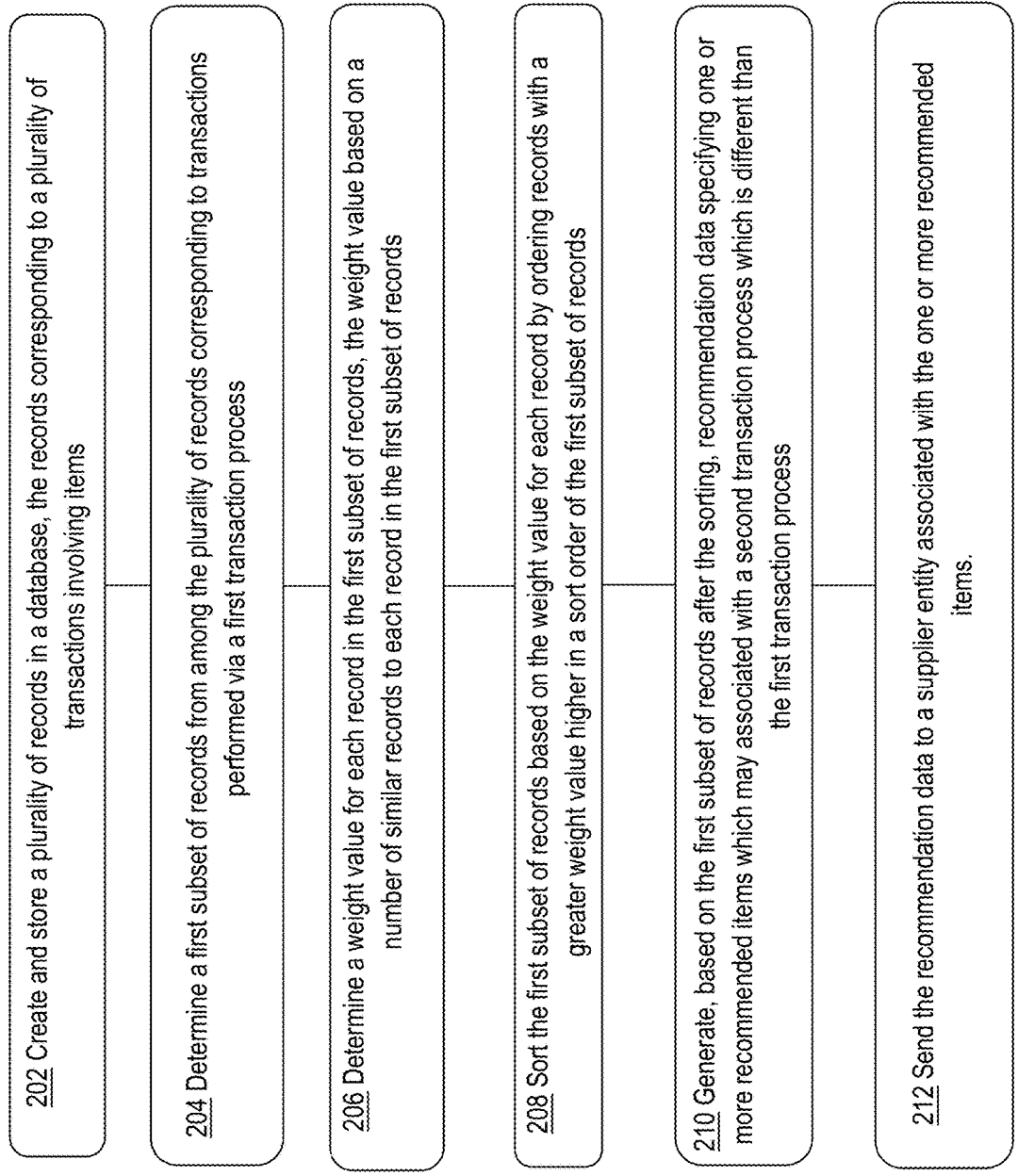
FIG. 2 is an illustrative flow diagram of a catalog recommendation process according to various embodiments.

FIG. 2 illustrates an example process performed by the e-procurement server 120 computer for recommending modifications for cataloging items. FIG. 2 is shown in simplified, schematic format for purposes of illustrating a clear example and other embodiments may include more, fewer, or different elements connected in various manners. FIG. 2 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In step 202, according to various embodiments, the server 102 is programmed or configured to create and store a plurality of records in a database, the records corresponding to a plurality of transactions involving items. The database may be any hardware and/or software entity based on an electronic memory which can store digital information. In various embodiments, the database is data repository 140. In various embodiments, a record is created every time a transaction occurs in an e-procurement process.

In various embodiments, the record is stored in the database immediately following the creation of the record. In various embodiments, a record is created manually or individually for transactions occurring outside of an e-marketplace. For example, a free-form requisition may be conducted and processed. The free-form requisition may be entered into the database by the supplier account or supplier computer, or buyer account or buyer computer, after the transaction has taken place. In various embodiments, a third-party system or entity periodically collects and stores created records for free-form requisitions from suppliers and buyers. In various embodiments, the supplier account or supplier computer, or buyer account or buyer computer automatically generate records for transactions in an e-procurement process. In various further embodiments, such records are stored by a third-party server maintaining the database. In various embodiments, a third-party service periodically requests records or other transactional data from the supplier account or supplier computer, or buyer account or buyer computer to create and store records.

In various embodiments, created and stored records may comprise one or more data types or fields which correspond to factors or details about the transaction and e-procurement process. Detailed examples of data types in a record are described herein and relate to FIGS. 4, 5, 6, and 7. For example, a transaction may comprise several data fields describing the parameters of the transaction, such as a unique data ID, the item which was the subject of transaction, the date and/or time the transaction was completed, the method through which the transaction was completed, the price of the item involved in e-procurement, the quantity of items per transaction, the descriptive category of the item procured, the supplier account or supplier computer, or buyer account or buyer computer the date of approval of procurement, and/or any other detail relating to a transaction sufficient to describe some aspect of the transaction in a record.

In various embodiments, the records may be viewed, added, removed, deleted, modified, sorted, parsed, relayed, sent, received, or otherwise manipulated in the database. In various embodiments, only particular entities involved in the transaction and e-procurement processes have access to records in the database. In various embodiments, an entity with access to the records may sort or order the records in some manner according to the data fields or details associated with the plurality of records in the database. For example, an entity with access to the records may cause the database to sort records according to the date of the transaction, with procurement processing occurring at earlier dates being shown or sorted higher in a hierarchy than records of transactions occurring at later dates.

In various embodiments, records may be grouped together based on the data fields or detailed associated with the plurality of records in the database. For example, records associated with transactions occurring through free-form requisitions may be grouped with other records associated with transactions occurring through free-form requisitions. Likewise, records associated with transactions occurring through catalog requisitions may be grouped with other records associated with transactions occurring through catalog requisitions.

In step 204, according to various embodiments, the server 102 is programmed or configured to determine a first subset of records from among the plurality of records corresponding to transactions performed via a first transaction process. The determination of the first subset of records may be according to any aspect of the records inherent to a record. For example, the server 102 may group records together according to the method of procurement for each item included in a transaction according to the record. Items obtained through free-form requisitions may be grouped with other items procured in the same fashion. In various embodiments, the first subset of records in a grouping of all items which are associated with a similar method of procurement.

In various further embodiments, the first subset is an addition subset of another subset of records based on some secondary factor. For example, server 102 may cause grouping of records based on the method of procurement associated with those records as discussed above. An additional subset of records may be related to a secondary factor such as the supplier associated with the transaction corresponding to the records. Specifically, the first subset of records may be all records associated with a method of procurement for only a particular seller. Any number of criteria may be used to create the first subset of records, including any of the datatypes discussed herein.

In various embodiments, the first subset of records may only comprise items corresponding to transactions performed via a singular particular procurement process. In various embodiments, the first subset of records may comprise items according to multiple particular procurement processes. For example, the first subset of records may include both records corresponding to transactions performed via free-form procurements and transaction performed via third-party transactions, such as an intermediate retailer or agent. In various embodiments, the first subset of records may comprise all items not following some particular criteria. For example, the first subset of records may be determined such that each procurement process related to the first subset of records excludes only those procurement processes involving catalog-based procurements.

In step 206, according to various embodiments, the server 102 is programmed or configured to determine a weight value for each record in the first subset of records, the weight value based on a number of similar records to each record in the first subset of records. The weight value or metric may be determined in any method necessary to assign some identifying value to a record or group of records. In various embodiments, the weight value is calculated by summing the number of similar records in the first subset of records. A similar record may be any record determined to have some data or aspect which is congruent to some data or aspect of another separate record. In various embodiments the weight value is calculated by aggregating some data or aspect of similar records in the first subset of records. For example, records specifying procurement of ITEM A may be grouped in the aggregate.

In various further embodiments, only records having exactly identical data fields will be counted toward a summed weight value for each record. For example a record may specify ITEM A was the item involved in the transaction corresponding to the record and the transaction was performed via FREE-FORM procurement. In the first subset of records, there may exist forty-six other records specifying ITEM A was the involved item in a corresponding transaction and the transaction was performed via FREE-FORM procurement. In such a case, each record specifying ITEM A and FREE-FORM will have a weight of 47. In various embodiments, records having similar or nearly identical data fields will be counted toward a summed weight value.

In various embodiments, a new record is created in response to the determination of the weight value. In various further embodiments, the new record has similar data to a number of grouped records with the addition of the calculated weight value. In various further embodiments, the new records in included in the first subset of records. In various further embodiments, all similar records to the new record are deleted from the database in response to the creation of the new record and the new record is used in subsequent steps of the process.

In various embodiments, records may be considered similar based on a subset of the data fields associated with the record. For example, a record specifying ITEM A was procured via FREE-FORM procurement on Jun. 25, 2019 may be considered as a similar record to another record specifying ITEM A was procured via FREE-FORM procurement on Jun. 26, 2019. As an additional example, a record specifying ITEM B was bought in a FREE-FORM procurement from SUPPLIER C may not be considered identical to another record specifying ITEM B was bought in a FREE-FORM procurement from SUPPLIER D.

The weight value of a record may be any value or data instance sufficient to convey a records relative occurrence or value in relation to other records in the first subset of records. In various embodiments, the weight value may be modified in some manner subsequent to determination to more clearly convey some aspect of the record. For example, the summed weight of a record described above may be further modified by dividing the summed weight by the total number of records in the first subset of records to provide a relative percentage of record weight. Using the example above, a record with a weight of 47 in the first subset of records having a total number of records of two-hundred forty-two, will have a relative percentage of 47/242*100 or 19.42%.

In various embodiments, the weight value may be based on some combination of values, frequency, data field, or other metric inherent to records in the first subset of records. For example, a profit-mean weight value may be calculated by summing a profitability value for each similar record than dividing the summed profitability value by the number of similar records to produce a profit-per-transaction-based weight value.

In step 208, according to various embodiments, the server 102 is programmed or configured to sort the first subset of records based on the weight value for each record by ordering records with a greater weight value higher in a sort order of the first subset of records. For example, records which were calculated to have a higher numeric weight value or metric than other records in the first subset of records may be displayed, considered, parsed, or retrieved from the database before other records with a lower numeric weight. For example, for weight values based purely on occurrences of records in the first subset of records, records having larger numbers of similar records in the first subset of records will be ordered higher in the sort order.

In various embodiments, sorting the first subset of records comprises creating a hierarchy of records representing the sort order of each record in the first subset of records. The hierarchy may be utilized by the server 102 for any process or function performed by the system, such as displaying the relative weight values of each record in a database or creating familial relationships between records in the first subset of records. In various embodiments, sorting the first subset of records comprises creating a new instance of the first subset of records and sorting the new instance. In various embodiments, the records are sorted directly on the database.

In various embodiments, sorting the first subset of records comprises establishing one or more relationships between the sorted records and/or hierarchy. Records having similar features to other records in the sorted order or hierarchy may be redistributed accordingly. For example, if ITEM A is substantially related to ITEM B, meaning consumers of ITEM A are very likely to also buy ITEM B, the weight value or sort order of ITEM B may be modified such that ITEM B has a weight value closer to ITEM A.

In step 210, according to various embodiments, the server 102 is programmed or configured to generate, based on the first subset of records after the sorting, recommendation data specifying one or more recommended items which may associated with a second transaction process which is different than the first transaction process. Recommendation data may be any data, electronic signal, message, indication, interface, or other medium sufficient to convey to a supplier or other entity a recommendation for modifying transactional processes for items corresponding to records in the first subset of records.

In various embodiments, generating recommendation data comprises determining one or more items corresponding to records in the first subset of records which should be made procurable through a different transaction process than the first transaction process. For example, the recommendation data may comprise data specifying that at least one item corresponding to at least one record in the first subset of records can be made available for procurement through a catalog. In various further embodiments, the first subset of records comprise only records corresponding to transactions performed through a free-form transaction process and the recommendation data comprises data specifying that one or more items corresponding to the first subset of records can be offered through a catalog procurement process.

The second transaction process may be any transaction process which is different than the first transaction process. In various embodiments, the recommendation data only comprises data corresponding to items specified in a second subset of the first subset of records. For example, after sorting records by weight value, the recommendation data may only comprise recommendations associated with items having a weight value higher than a specified threshold weight value.

In various embodiments, only items corresponding to records having a certain weight value are included in the recommendation data. For example, only items corresponding to records having a weight value above some defined weight threshold may be included in the recommendation data. In various embodiments, recommendation data comprises one or more related items. For example, even if recommendation data includes ITEM A but not ITEM B based on some cutoff threshold of weight value, but ITEM B is substantially related to ITEM A, ITEM B may be included in the recommendation data.

In various embodiments, the recommendation data is a recommendation for the exclusion of one or more items from the catalog procurement process. For example, the first determined subset of records may be determined based on records involving the catalog procurement process and weight values may be assigned to records specifying items based on the frequency with which items are bought based on similar records. A threshold cutoff may be determined for items having a weight value below a specified threshold and the recommendation data may comprise those items in order to recommend that a seller remove those items from a catalog to allow for a more efficient cataloging process.

In step 212, according to various embodiments, the server 102 is programmed or configured to send the recommendation data to a supplier entity associated with the one or more recommended items. The recommendation data may be sent and received in any format capable of conveying the recommendation data to the supplier entity. In various embodiments, the supplier entity receives the recommendation data through an electronic user interface built into an e-procurement platform. In various embodiments, recommendation data is approved by a third party or facilitator of an e-marketplace before being sent to a supplier entity.

In various embodiments, the above steps are performed at regular time intervals and recommendation data is sent to the supplier entity at regular time intervals. In various embodiments the above steps are manually requested to be performed by a third party or e-marketplace facilitator and sent to the supplier entity in response to the manual request. In various embodiments, a manual request is received from the supplier entity and the above steps are performed in response to that request.

In various embodiments not pictured in FIG. 2, an efficiency metric may be calculated based on the catalog recommendations for a supplier. For example, an e-procurement service may be programmed to track, subsequent to making recommendation data and implementing those recommendations to generate a modified catalog, transaction data relating to transactions made for items included in the modified catalog. In various further embodiments, the service may be programmed to track the transaction data for an amount of transactions for an item in the modified catalog procured from both the modified catalog and other transaction forms, such as free-form transactions.

"Tracking," in this context, means storing data, by a facilitator or selling in the e-marketplace, in an electronic memory, for a plurality of transactions facilitated through, and outside of, the e marketplace. The stored data is grouped according to the method of transaction, such as catalog-based procurement, punch-out-based procurement, free-form transactions, or any other transaction which involves the exchange of an item for compensation. The seller or facilitator of an e-procurement service may view and manipulate the transaction data to gauge how effective catalog modifications are. For example, a seller may examine stored transaction data to determine the effect that a catalog modification has had on overall commerce or method of commerce in the e-marketplace. An efficiency metric may be calculated based on the proportion of procurements of the item from the modified catalog and other transaction forms to show a level of efficiency in procurements for the item. In various further embodiments, an efficiency metric is calculated before and after the modified catalog is made available to show the chance in procurement efficiency subsequent to the modification.

4. Example Environments

FIG. 4 is an illustrative representation of a database collection of e-procurement records corresponding to various embodiments. Record database 400 may be any data storage system, program, or hardware capable of storing records relating to e-procurement transactions. In various embodiments, record database 400 stores records relating to e-procurement transactions between a buyer and seller. Records may be electronic data representing the parameters or details of a transaction for a requisitioned item or product in an e-procurement system.

In various embodiments, a record is an electronic receipt of a transaction. In various embodiments, a record is a database entry having a set number of data fields corresponding to information regarding the transaction. In various embodiments, records are created and stored in a database such as record database 400 in response to initiating a transaction. In various embodiments, a record in created in response to processing a transaction. In various embodiments, a record is created in response to fulfilling or completing an e-procurement process.

In various embodiments, record database 400 includes data repository 140 which comprises one or more records relating to e-procurement transactions. For example, as part of server 102, data repository 140 may store the created records which may be used as part of the catalog recommendation process described herein. In various embodiments, data repository 140 may store historical records relating to a plurality of transactions involving one or more supplying or buying entities. In various embodiments, data repository only stores historical records created within a certain time period. In various embodiments, data repository 140 automatically deletes records from record database 400 when records are no longer needed or reach a certain age in the database system.

In various embodiments not shown in FIG. 4, server 102 receives one or more future records regarding one or more procurement transactions which are determined to occur a time in the future. In response to receiving data corresponding to a future transaction, server 102 make create a future record and store it in record database 400. In various embodiments, future records are stored in a separate area of record database 400 than historical records. In various embodiments not shown in FIG. 4. server 102 identifies trends in historical records relating to one or more patterns which can be extrapolated to create one or more "extrapolated records." The extrapolated records may be stored in the record database. In various embodiments, expected records are stored in a separate area from historical records.

In various embodiments, record table 410 comprises categorical data types such as record header 420. Record header may be any set of categories, data fields, data types, or any other parameter and/or data sufficient to convey a categorical aspect of records stored in record database 400. For example, record header 420 shows four fields associated with records stored in record database 400. The fields are TRANSACTION NO., DATE, ITEM CODE, and TRANSACTION TYPE.

In various embodiments, TRANSACTION NO. in a record header 420 may denote a unique numerical identifier for each individual record relating to a transaction. In various further embodiments, unique numerical identifiers are sequential. In various embodiments, DATE in a record header 420 may denote a calendar date identifier corresponding to a date of relevance for a record. In various embodiments, a calendar date identifier may represent the date a record was created, the date an e-procurement was requested, the date an e-procurement was fulfilled, the date an e-procurement was completed, the date a record was stored in record database 400 or any other date relevant to an e-procurement procedure.

In various embodiments, ITEM CODE in a record header 420 may denote a unique item identifier for an item which was or will be the subject of an e-procurement transaction. In various embodiments, a unique item identifier may be a name of an item, a string-based primitive datatype for identifying an item in a database, a unique identifier created by a supplier, or any other code or data sufficient to identify an item associated with a transaction corresponding to the record. In various embodiments, TRANSACTION TYPE in a record header 420 may denote the process by which an e-procurement transaction is requested or completed. In various embodiments, the process may be a free-form procurement, a catalog-based procurement, a punch-out procurement, or any other method of procurement which is sufficient to perform a procurement transaction for an item.

In various embodiments, a punch-out procurement is a procurement in which a buyer account or buyer computer reviews a list or collection of items available from a supplier directly from a computer system owned and operated by the supplier. A punch-out procurement may allow a buyer account or buyer computer to select and request procurements of items outside of a typical e-marketplace from a supplier. A supplier account or supplier computer will then send data corresponding to selections of items of the buyer account or buyer computer for procurement to a standard e-marketplace application or database where a procurement will be processed according to the protocols of the standard e-marketplace. For example, a buyer buying ITEM A from a punch-out list on a supplier's website, the supplier may generate data specifying that a buyer account or buyer computer has bought ITEM A from the punch-out list and send corresponding data to a third party e-procurement system, where the e-procurement system will responsively create a record specifying a transaction for ITEM A from the supplier account or computer to the buyer account or buyer computer and perform the e-procurement process on behalf of both entities.

In various embodiments, record data 430 is any kind of data capable or representing, corresponding to, or otherwise conveying a record relating to an e-procurement transaction. For example FIG. 4 shows record table 410 having multiple records relating to e-procurement transactions, record data 430(1)-(n). Each of records 430(1)-(n) has data fields relating to fields specified by record header 420.

For example, record data 430(1) shows a TRANSACTION NO. of #000112234, a DATE of 06.25.2019, an ITEM CODE of "SUNGLASSES" and a TRANSACTION TYPE of FREE-FORM. Record data 430(1) may therefore relate to an e-procurement transaction in which a pair of sunglasses was bought on Jun. 25, 2019 through a free-form transaction.

Conversely, record data 430(n) shows a TRANSACTION NO. of #000112243, a DATE of 07.01.2019, an ITEM CODE of "BEACH TOWEL—RED" and a TRANSACTION TYPE of PUNCH-OUT. Record data 430(1) may therefore relate to an e-procurement transaction in which a red beach towel was bought on Jul. 1, 2019 through a punch-out transaction.

In various embodiments, record data 430 may have one or more traits beyond the specified data fields of record header 420. In various embodiments, record data 430 may lack one or more traits specified by record header 420. In various further embodiments, record data 430 which lacks one or more traits specified by record header 420 may contain a null character or blank character for that trait in record table 410.

Figure 5:
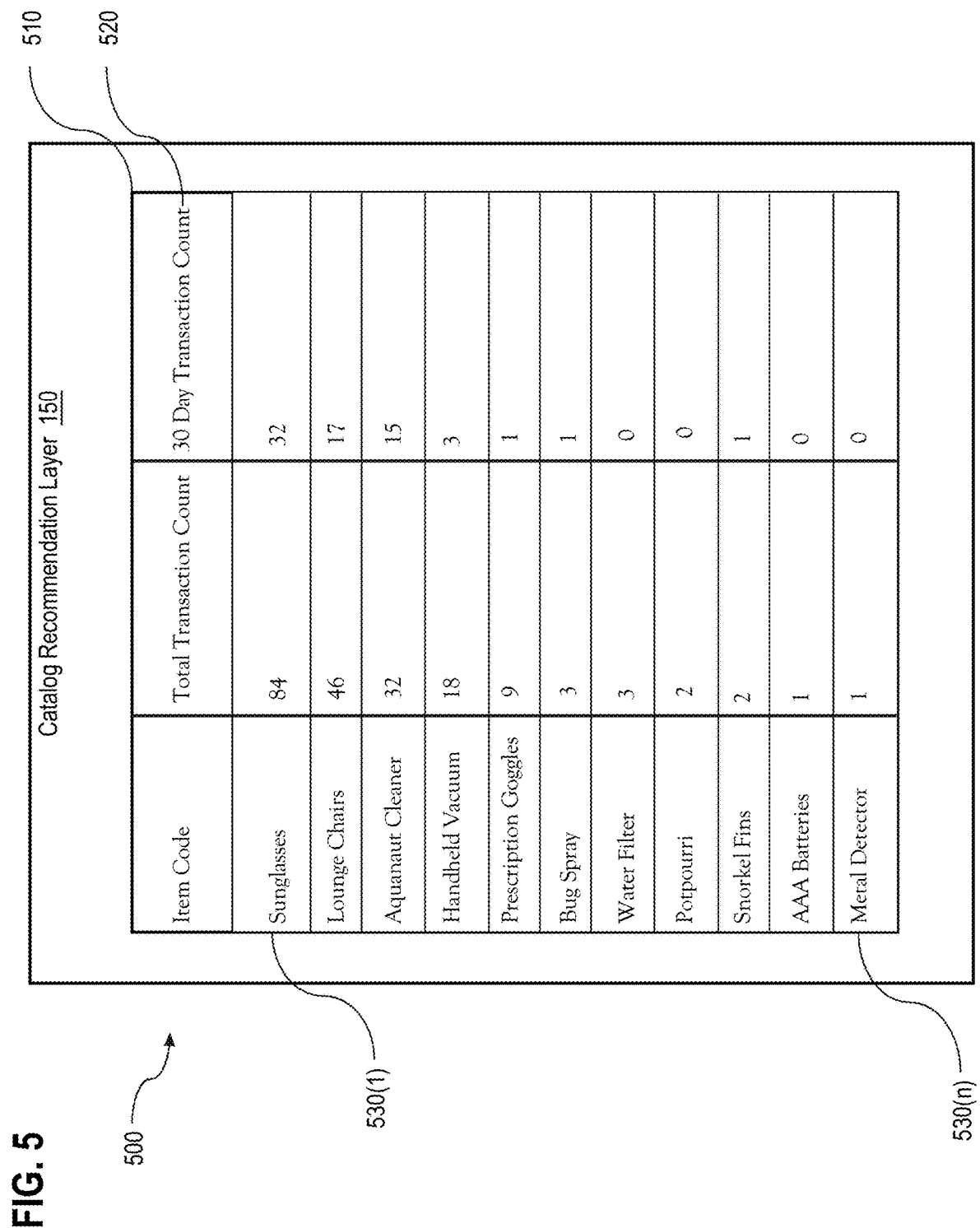
FIG. 5 is an illustrative representation of a database collection of a sorted subset of e-procurement records corresponding to various embodiments.

FIG. 5 is an illustrative representation of a database collection of a sorted subset of e-procurement records corresponding to various embodiments. Record transaction dataset 500 may be any data storage system, program, or hardware capable of maintaining records relating to e-procurement transactions. Record transaction dataset 500 may contain the first subset of records according to the processes described herein. For example, as shown in FIG. 5, record transaction dataset 500 may contain only records having a transaction data field of FREE-FORM.

In various embodiments, record transaction dataset 500 includes catalog recommendation layer 150 which comprises, temporarily or stored in memory, one or more records relating to e-procurement transactions which are a subset of record table 410. In various embodiments, server 102 utilizes catalog recommendation layer 150, causing the layer to make a temporary copy of records in the first subset of records to engage the sorting process of the first subset of records.

In various embodiments, record transaction table 510 comprises records relating to e-procurement transactions. In various embodiments, record transaction table 510 presents records in an aggregated format showing similar records from the first subset of records grouped together. For example, as shown in FIG. 5, records having similar item codes in the first subset of records are grouped together in a new aggregated record set.

In various embodiments, record transaction table 510 comprises categorical data types such as record transaction header 520. Record transaction header 520 may comprise one or more data fields corresponding to aspects of the aggregated record set. For example, record transaction header 520 contains fields ITEM CODE, TOTAL TRANSACTION COUNT, and 30 DAY TRANSACTION COUNT. These data fields may correspond to the item code of the aggregated similar records, the total number of e-procurement transactions specified by the aggregated records, and the number of e-procurement transactions specified by the aggregated records in the last thirty days respectively.

In various embodiments, record transaction data 530 is any kind of data capable or representing, corresponding to, or otherwise conveying an aggregation of records relating to e-procurement transactions. For example FIG. 5 shows record transaction table 510 having multiple aggregations of records relating to e-procurement transactions, record transaction data 530(1)-(n). In various embodiments, record transaction data 530 has data fields corresponding to one or more of the data fields specified by the record transaction header 520.

For example, as depicted in FIG. 5, record transaction data 530(1) relates to an aggregation of the first subset of records corresponding to free-form procurements further aggregated by the ITEM CODE data field. In this case 530(1) relates to the aggregated records for free-form procurements involving SUNGLASSES. The TOTAL TRANSACTION COUNT is 84, meaning a total of 84 free-form requisitions for SUNGLASSES have been made. The 30 DAY TRANSACTION COUNT is 32, meaning a total of 32 requisitions for SUNGLASSES have been made in the last thirty days.

In various embodiments, record transaction data 530 is sorted according to one or more criteria from the record transaction header 520. For example, as depicted in FIG. 5, record transaction data 530 is sorted in descending order of TOTAL TRANSACTION COUNT. For example, record transaction data 530 having a higher TOTAL TRANSACTION COUNT is listed higher in the list than other record transaction data 530. In various embodiments, sorting the records in the first subset of records comprises ordering record transaction data 530. In various embodiments assigning a weight value to records comprises using data fields such as TOTAL TRANSACTION COUNT as the numerical weight value during the recommendation process. In various embodiments, any aspect of records, aggregated records, or data gleaned from records may be used as a weight value and ordering determination.

FIG. 6 is an illustrative representation of a database collection of a sorted subset of e-procurement records corresponding to various embodiments. FIG. 6. shows an alternative aggregation and sorting process for records in the first subset of records relating to monetary data values. For example, record transaction table 510 still comprises aggregated records relating to e-procurement transactions. However, the sorting of the aggregated records now corresponds to monetary values.

For example, in various embodiments, record price table 610 comprises categorical data types such as record price header 620. Record price header 620 may comprise one or more data fields corresponding to price aspects of the aggregated record set. For example, record price header 620 contains fields ITEM CODE, SPEND LEVEL, and PROFIT MADE These data fields may correspond to the item code of the aggregated similar records, the total amount of currency spent on the aggregate items corresponding to the aggregate records, and the profit made as a result of the e-procurement processes respectively.

In various embodiments, record price data 630 is any kind of data capable or representing, corresponding to, or otherwise conveying an aggregation of records relating to e-procurement transactions. For example FIG. 6 shows record transaction table 510 having multiple aggregations of records relating to e-procurement transactions, record transaction data 630(1)-(*n*). In various embodiments, record price data 630 has data fields corresponding to one or more of the data fields specified by the record price header 620.

For example, as depicted in FIG. 6, record price data 630(1) relates to an aggregation of the first subset of records corresponding to free-form procurements further aggregated by the ITEM CODE data field. In this case 630(1) relates to the aggregated records for free-form procurements involving AQUANAUT CLEANER. The SPEND LEVEL is $12,799.68, meaning the total amount of monetary currency spend of AQUANAUT CLEANER free-form transactions has been $12,799.68. The PROFIT MADE is $3,598.47, meaning the monetary SPEND LEVEL less the difference paid in acquiring and performing the free-form requisitions equals $3,598.47.

In various embodiments, record price data 630 is sorted according to one or more criteria from the record price header 620. For example, as depicted in FIG. 6, record price data 630 is sorted in descending order of SPEND LEVEL. For example, record price data 630 having a higher SPEND LEVEL is listed higher in the list than other record price data 630. In various embodiments, sorting the records in the first subset of records comprises ordering record price data 630. In various embodiments assigning a weight value to records comprises using data fields such as SPEND LEVEL as the numerical weight value during the recommendation process. In various embodiments, any aspect of records, aggregated records, or data gleaned from records may be used as a weight value and ordering determination.

FIG. 7 is an illustrative representation of a database collection of a sorted subset of e-procurement records further divided into multiple sub-subsets of data corresponding to various embodiments. Record transaction data subset 700 may be any data storage system, program, or hardware capable of maintaining records relating to e-procurement transactions.

In various embodiments, record transaction data subset 700 includes catalog recommendation layer 150 which comprises, temporarily or stored in memory, one or more records relating to e-procurement transactions which are a subset of record table 410 and a further subset of record transaction table 510.

For example, as depicted in FIG. 7, record transaction table 510 shows record transaction data 530(1)-(*n*) that is separated by threshold boundary 710, effectively separating the aggregated record data into two distinct groupings. In various embodiments, threshold boundary 710 may be imposed upon record transaction table 510 to convey the further separation of record transaction data 530(1)-(*n*) into two or more distinct groups. Separating data into one or more groups via a threshold boundary 710 may serve to generate groupings of the first subset of records which have some advantage to the recommendation process.

For example, as depicted in FIG. 7, the threshold boundary has been drawn between record transaction data 530 for HANDHELD VACUUM and record transaction data 530 for PRESCRIPTION GOGGLES. A boundary threshold might be been specified for TOTAL TRANSACTION COUNT having an amount between nine and eighteen total units. As a result, the record transaction data 530 for HANDHELD VACUUM was placed in a first group above the boundary and the record transaction data 530 for PRESCRIPTION GOGGLES was placed in a second group below the boundary.

In various embodiments, separating record transaction data 530 into a distinct subgroup may serve to isolate data which will be more useful to the recommendation process. for example, it may be inefficient for a supplier to add items to a catalog which have only been the subject of e-procurement procedures via a free-form process less than ten times. Therefore, items which was been the subject of e-procurement procedures more than ten time may be included in a recommendation for cataloging.

Figure 8:
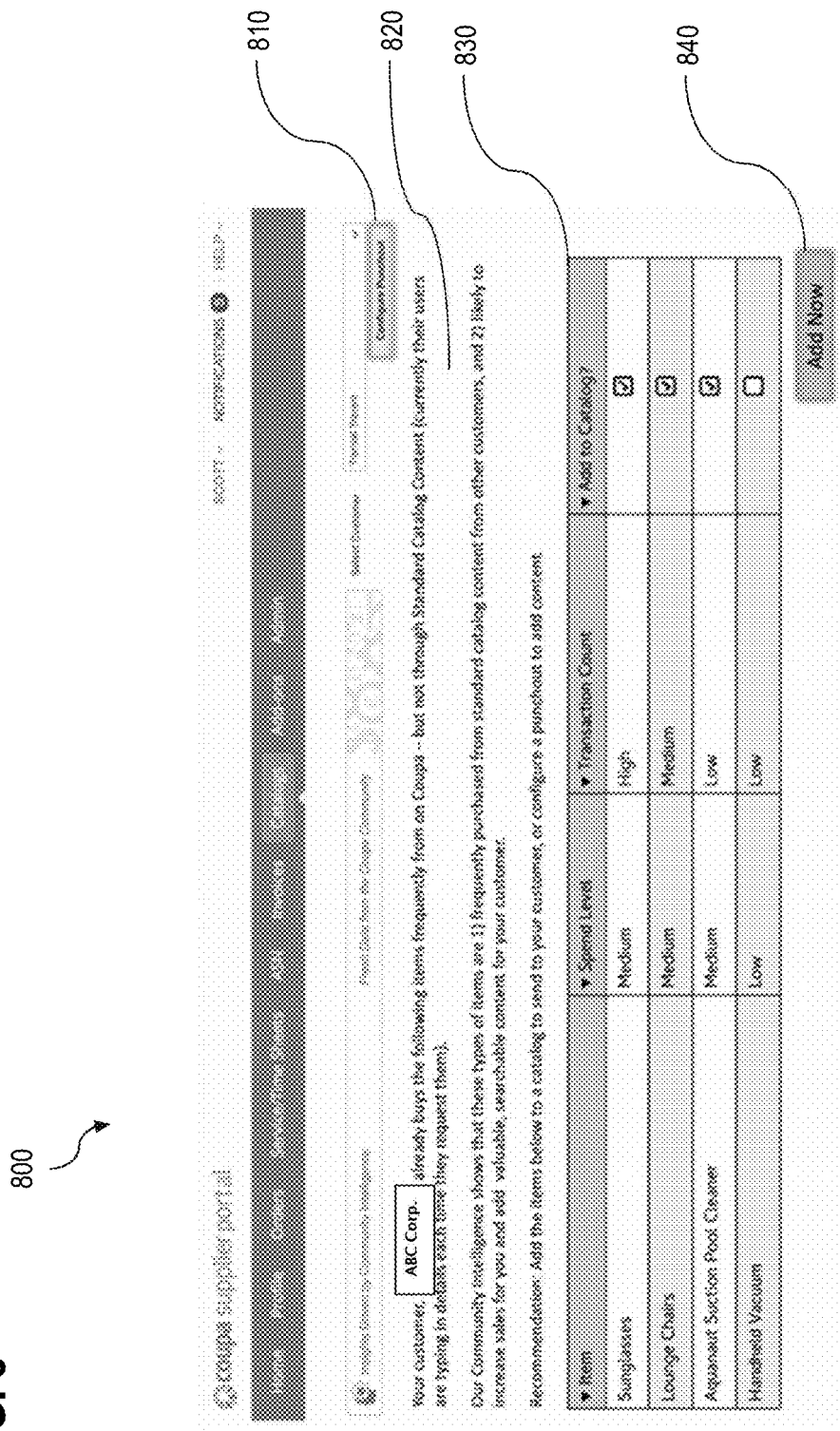
FIG. 8 is an illustrative graphical user interface for making catalog recommendations to suppliers according to various embodiments.

FIG. 8 is an illustrative graphical user interface for making catalog recommendations to suppliers according to various embodiments. In various embodiments, graphical recommendation interface 800 is any interface which may be presented to a supplier such as those utilizing supplier computer 122*a*-*n* as part of the catalog modification recommendation process.

As depicted in FIG. 8, graphical recommendation interface 800 may comprise various elements such as an electronic user interface for navigating web services or digital applications on one or more of supplier computer 122*a*-*n*. Graphical recommendation interface may be an interface designed to be shown to supplier entities in order to parse and act on recommendations from third parties facilitating the e-marketplace that the supplier uses to perform e-procurement transactions.

In various embodiments, graphical recommendation interface 800 may comprise recommendation text 820 elaborating on the recommendation process. For example, recommendation text may explain in a written language to purposes and results of the recommendation processes described herein. For example, as shown in FIG. 8, recommendation text describes that a buyer, "ABC Corp.", is performing an inordinate amount of free-form requisitions for a set of items. The recommendation elaborates that it may be advantageous to a supplier to add items to a catalog to increase ease of access for buyers such as ABC Corp.

In various embodiments, graphical recommendation interface 800 may comprise recommendation table 830 showing various items which are recommended to be added as part of a modified catalog. For example, as depicted in FIG. 8 the recommendation table 830 shows the four items grouped above the threshold boundary in FIG. 7, namely SUNGLASSES, LOUNGE CHAIRS, AQUANAUT SUCTION POOL CLEANER, and HANDHELD VACUUM. In various embodiments, data fields associated with the items or other determined data may be shown in the recommendation table 830. for example, as depicted in FIG. 8, the SPEND LEVEL and TRANSACTION COUNT are shown next to the ITEM identifier as part of the recommendation. In various embodiment data intensity levels such as LOW, MEDIUM, or HIGH may be shown in the recommendation table 830 corresponding to the weight value or some other calculated value corresponding to the recommendation items.

In various embodiments, graphical recommendation interface 800 may comprise item punchout button 810, which will configure a punch-out list using the recommendation data. In various embodiments, a user account or user computer may select one or more recommended items and manually interact with punchout button 810 to create a punch-out list. In various further embodiments, punchout button 810 is configured to send a supplier account or supplier computer to a supplier's own web service to create a punch-out with the supplied recommendation data.

In various embodiments, a supplier account or supplier computer may manually select a subset of the presented items in recommendation table 830 for inclusion into a catalog. For example, as depicted in FIG. 8, an account or computer has selected all recommended items except for HANDHELD VACUUM for addition to a catalog. In various embodiments, graphical recommendation interface 800 may comprise item addition button 840. Item addition button 840 may use the manually selected fields from recommendation table 830 to initiate a catalog creation process.

Figure 9:
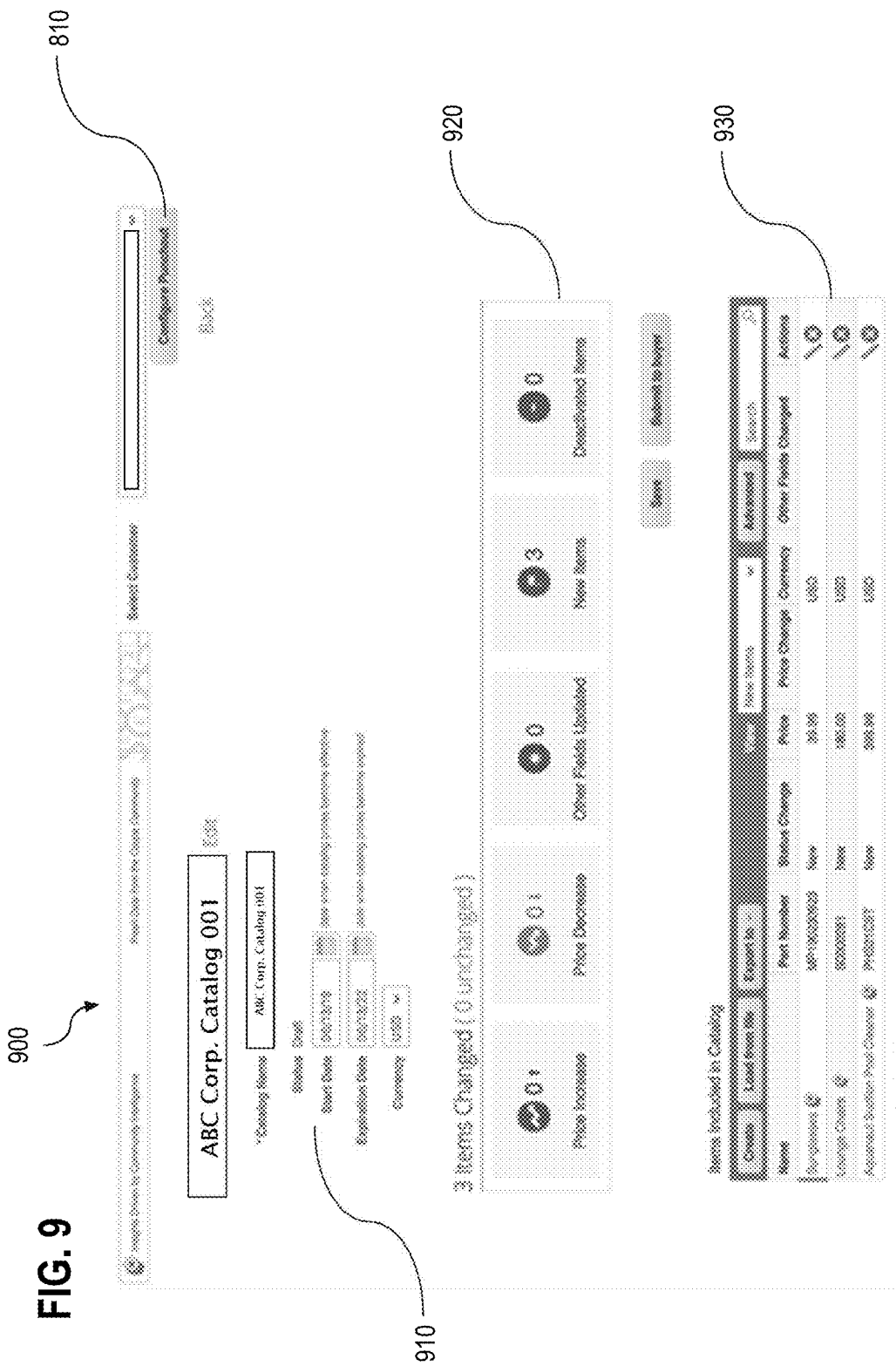
FIG. 9 is an illustrative graphical user interface for creating a catalog corresponding to recommendations to suppliers according to various embodiments.

FIG. 9 is an illustrative graphical user interface for creating a catalog corresponding to recommendations to suppliers according to various embodiments. In various embodiments, graphical creation interface 900 is any interface which may be presented to a supplier account or supplier computer such as those utilizing supplier computer 122*a*-*n* as part of a catalog generation process in accordance with the catalog recommendation process.

As depicted in FIG. 9, according to various embodiments, graphical creation interface 900 may comprise catalog creation fields 910 as part of the catalog creation process. Catalog creations fields 910 may serve as a supplier input for the creation of modification of a catalog. For example, as depicted in FIG. 9, catalog creation fields 910 comprises fillable fields for Catalog Name, Start Date, Expiration Date, a Currency for procurements. A supplier account or supplier computer may fill these fields in order to specify the parameters of a catalog containing the recommended items.

In various embodiments not depicted in FIG. 9, catalog creation field 910 may contain one or more fields for importing and modifying an existing catalog. For example, user graphical creation interface may allow a supplier account or supplier computer to select an existing catalog of items which will be modified to include one or more of the recommended items.

In various embodiments, graphical creation interface 900 may comprise data heuristics chart 920 which graphically conveys one or more aspects of a new catalog, a currently modified catalog, or items in a catalog. For example, FIG. 9 depicts data heuristics chart 920 having a Price Increase icon, a Price Decrease icon, an Other Fields Updated icon, a New Items icon and a Deactivated Items icon. The icons may relate some information about a new catalog or existing catalog if one or more of the recommended items are added. For example, FIG. 9 depicts the New Items icon showing three new items will be added to a created catalog in response to filling catalog creation fields 910.

In various embodiments, graphical creation interface 900 may comprise item chart 930 which graphically conveys one or more items which were the subject of the catalog recommendation process. For example, item chart 930 may show the items to be added to a new or modified catalog and corresponding data fields of the items. For example, as depicted in FIG. 9, the SUNGLASSES, LOUNGE CHAIRS, and AQUANAUT SUCTIONS POOL CLEANER items are presented along with corresponding information for PART NUMBER, STATUS CHANGE, PRICE, PRICE CHANGE, CURRENCY, OTHER FIELDS CHANGED AND ACTIONS. The items and corresponding fields may present information to a supplier on what information will be shown in the catalog when the items are added.

In various embodiments, graphical creation interface 900 may also comprise punchout button 810 which will configure a punchout based on the recommendation data.

Figure 10:
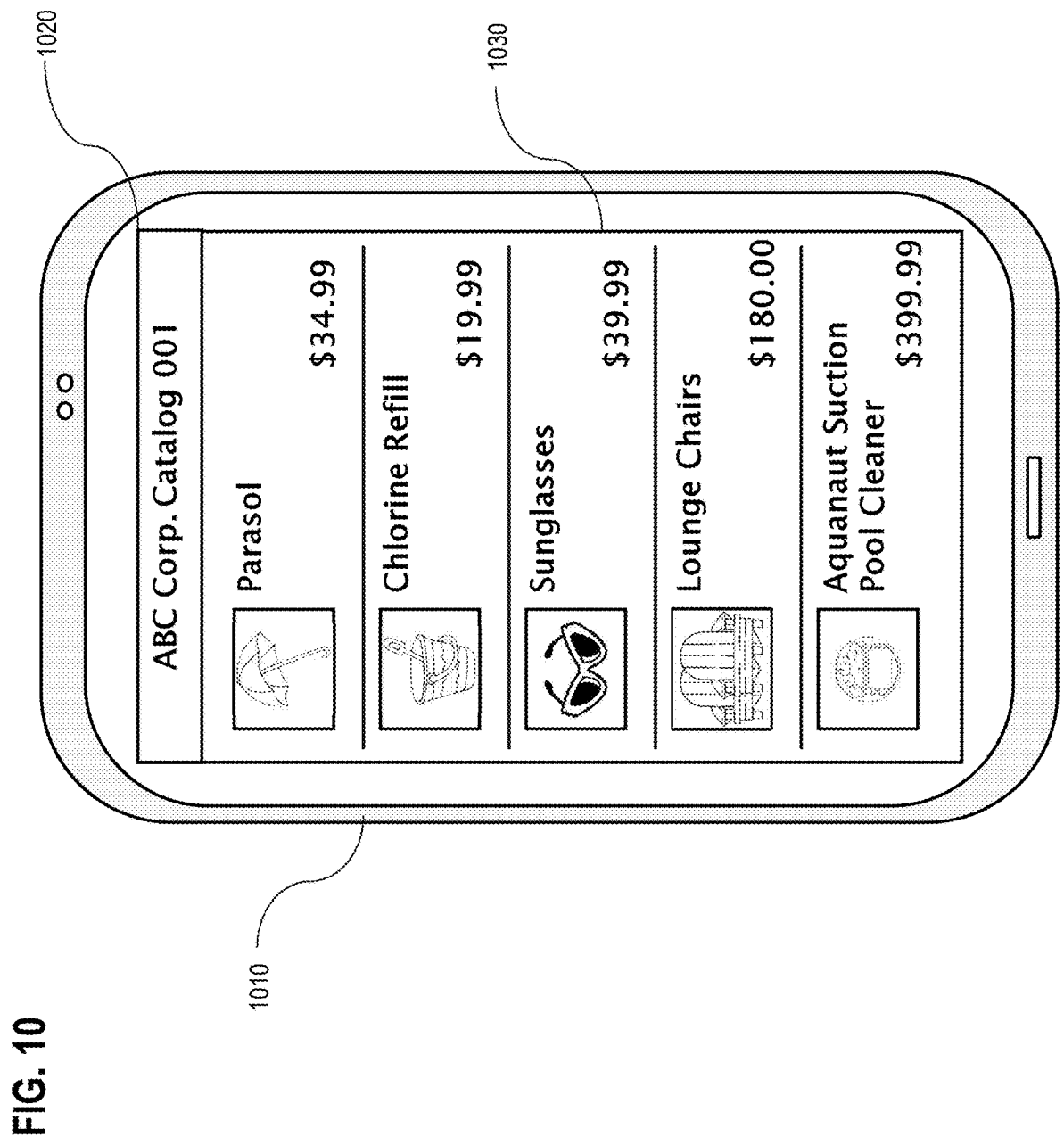
FIG. 10 is an illustrative graphical user interface implemented on a user device for reviewing updated catalogs for creating a catalog corresponding to recommendations to suppliers according to various embodiments.

FIG. 10 is an illustrative graphical user interface implemented on a user device for reviewing updated catalogs for creating a catalog corresponding to recommendations to suppliers according to various embodiments. In various embodiments a catalog modified or created according to the catalog recommendation process may be viewed on a graphical user interface on a user device such as user device 1010.

In various embodiments, user device 1010 displays a catalog list 1020 corresponding to the catalog modified in processes described herein. Catalog list 1020 may display any facet of a new, current or modified catalog in accordance with e-procurement procedures or facets of the e-marketplace. In various embodiments, catalog list comprises catalog item 1030 which is a selectable catalog item on user device 1010. For example, catalog item 1030 is a selectable catalog item corresponding to SUNGLASSES which a user may select on device 1010 in order to initiate an e-procurement procedure to procure SUNGLASSES from the catalog list 1020. Also included are items which may have been in an existing catalog before the recommendation process, such as PARASOL AND CHLORINE REFILL. Also included are items which were also added following the recommendation process, such as LOUNGE CHAIRS and AQUANAUT SUCTION POOL CLEANER.

5. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
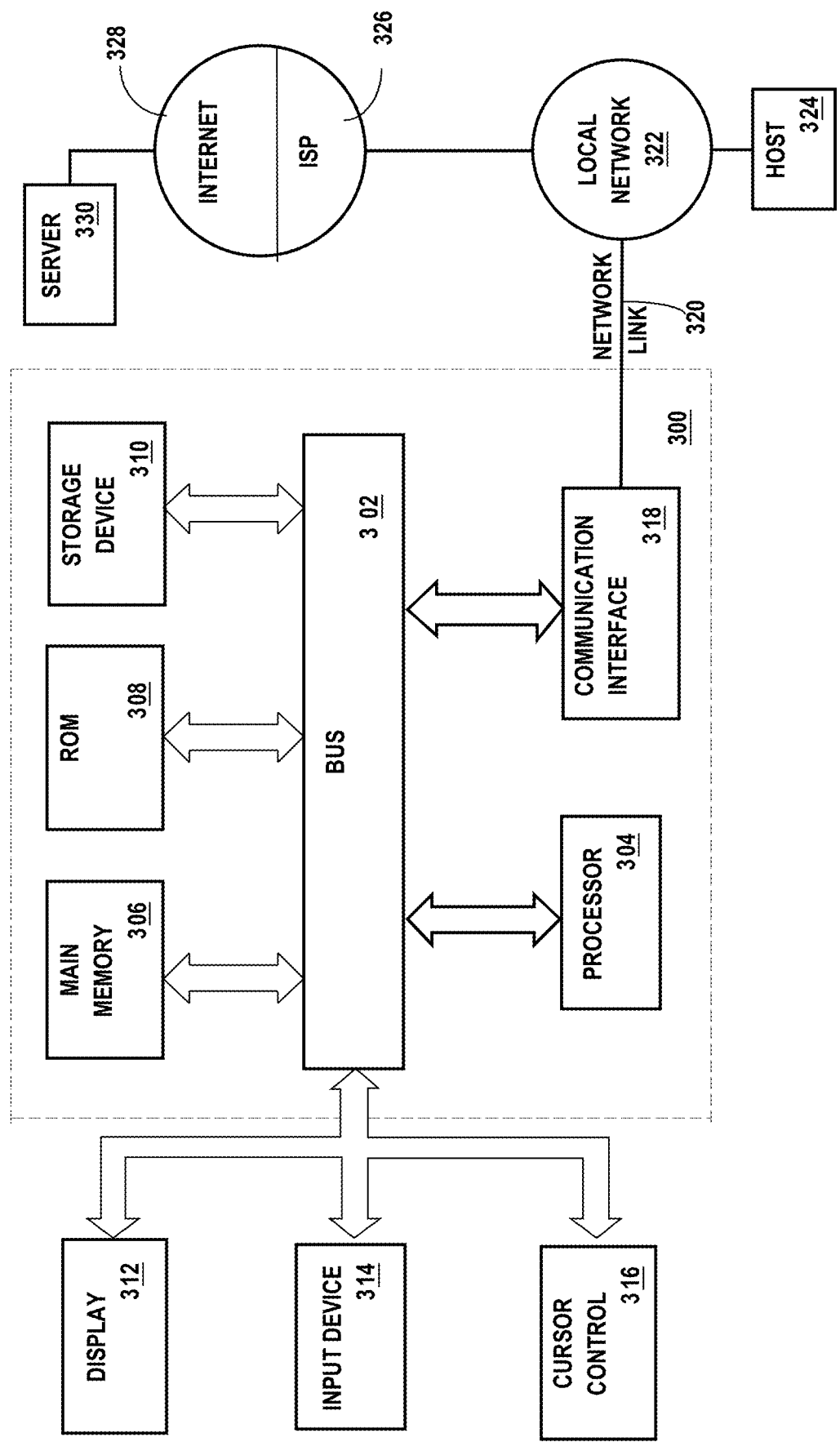
FIG. 3 is a block diagram that illustrates an example computer system with which an embodiment may be implemented.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos, or voice-based assistant software.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6.0. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    using a computer system coupled to a database, creating and storing a plurality of records in the database, the records corresponding to a plurality of transactions involving items;
    determining, by the computer system, a first subset of records from among the plurality of records, corresponding to transactions performed via a first transaction process, the first transaction process at least partly defined by a first method of procurement, the first method of procurement not involving ordering via digital catalog;
    determining, by the computer system, a weight value for each record in the first subset of records, the weight value based on a number of similar records to each record in the first subset of records, wherein a level of similarity between two records is a function of whether the two records reference at least one of the same item and the same method of procurement;
    using the computer system, sorting the first subset of records based on the weight value for each record by ordering records with a greater weight value higher in a sort order of the first subset of records;
    generating, by the computer system, and based on the first subset of records after the sorting, recommendation data specifying one or more recommended items which may be associated with a second transaction process which is different than the first transaction process, the second transaction process at least partly defined by a second method of procurement which is different than the first method of procurement;
    sending the recommendation data to a supplier computer associated with the one or more recommended items; and
    modifying, at least partly based on the recommendation data, a digital catalog to comprise the one or more recommended items.

2. The computer-implemented method of claim 1:
    the second transaction process involving ordering via digital catalog;
    the recommendation data comprising a recommendation to modify the digital catalog to comprise the one or more recommended items.

3. The computer-implemented method of claim 2, further comprising:
    sending an indication, to one or more buyer computers, that the one or more recommended items are available in a modified digital catalog;
    receiving, from the one or more buyer computers, approval data indicating approval of the modified digital catalog;
    in response to receiving the approval data, making available, to the one or more buyer computers, the modified digital catalog.

4. The computer-implemented method of claim 2, further comprising:
    tracking, by the computer system, first transaction data representing transactions involving the one or more items which were purchased through the modified digital catalog;
    tracking, by the computer system, second transaction data representing transactions involving the one or more items which were not purchased through the modified digital catalog;
    determining, by the computer system, an efficiency metric, the efficiency metric based on a proportion of transactions in the first transaction data and transactions in the second transaction data.

5. The computer-implemented method of claim 1, further comprising:
    receiving, by the computer system, a threshold weight value;

determining a second subset of records, from the first subset of records, each record in the second subset of records having a greater weight value than the threshold weight value;

wherein generating recommendation data specifying one or more recommended items comprises generating recommendation data specifying only items associated with records in the second subset of records.

6. The computer-implemented method of claim 1, wherein the steps of generating recommendation data specifying one or more recommended items and sending the recommendation data are performed periodically.

7. The computer-implemented method of claim 1, wherein the weight value for each record is further based on a total revenue value generated from transactions corresponding to the record and the similar records to the record in the first subset of records.

8. The computer-implemented method of claim 1, wherein the weight value for each record is further based on a number of total requests for one or more items associated with the record and the similar records to the record in the first subset of records.

9. The computer-implemented method of claim 1, wherein the weight value for each record is further based on a number of total completed transactions relating to the similar records to the record in the first subset of records.

10. The computer-implemented method of claim 1:
the second transaction process comprising selecting one or more items from a digital list maintained by the supplier computer;
the recommendation data comprising a recommendation to create a digital list comprising the one or more recommended items;
the method further comprising creating a digital list comprising the one or more recommended items.

11. One or more non-transitory computer-readable media storing instructions which, when executed by one or more processors, cause:
creating and storing a plurality of records in a database, the records corresponding to a plurality of transactions involving items;
determining a first subset of records from among the plurality of records, corresponding to transactions performed via a first transaction process, the first transaction process at least partly defined by a first method of procurement, the first method of procurement not involving ordering via digital catalog;
determining a weight value for each record in the first subset of records, the weight value based on a number of similar records to each record in the first subset of records, wherein a level of similarity between two records is a function of whether the two records reference at least one of the same item and the same method of procurement;
sorting the first subset of records based on the weight value for each record by ordering records with a greater weight value higher in a sort order of the first subset of records;
generating based on the first subset of records after the sorting, recommendation data specifying one or more recommended items which may be associated with a second transaction process which is different than the first transaction process, the second transaction process at least partly defined by a second method of procurement which is different than the first method of procurement;

sending the recommendation data to a supplier computer associated with the one or more recommended items; and modifying, at least partly based on the recommendation data, a digital catalog to comprise the one or more recommended items.

12. The computer-readable media of claim 11:
the second transaction process involving ordering via digital catalog;
the recommendation data comprising a recommendation to modify the digital catalog to comprise the one or more recommended items.

13. The computer-readable media of claim 12 further comprising instructions which, when executed by one or more processors, cause:
sending an indication, to one or more buyer computers, that the one or more recommended items are available in a modified digital catalog;
receiving, from the one or more buyer computers, approval data indicating approval of the modified digital catalog;
in response to receiving the approval data, making available, to the one or more buyer computers, the modified digital catalog.

14. The computer-readable media of claim 12, further comprising instructions which, when executed by one or more processors, cause:
tracking first transaction data representing transactions involving the one or more items which were purchased through the modified digital catalog;
tracking second transaction data representing transactions involving the one or more items which were not purchased through the modified digital catalog;
determining an efficiency metric, the efficiency metric based on a proportion of transactions in the first transaction data and transactions in the second transaction data.

15. The computer-readable media of claim 11 further comprising instructions which, when executed by one or more processors, cause:
receiving a threshold weight value;
determining a second subset of records, from the first subset of records, each record in the second subset of records having a greater weight value than the threshold weight value;
wherein generating recommendation data specifying one or more recommended items comprises generating recommendation data specifying only items associated with records in the second subset of records.

16. The computer-readable media of claim 11, wherein the steps of generating recommendation data specifying one or more recommended items and sending the recommendation data are performed periodically.

17. The computer-readable media of claim 11, wherein the weight value for each record is further based on a total revenue value generated from transactions corresponding to the record and the similar records to the record in the first subset of records.

18. The computer-readable media of claim 11, wherein the weight value for each record is further based on a number of total requests for one or more items associated with the record and the similar records to the record in the first subset of records.

19. The computer-readable media of claim 11, wherein the weight value for each record is further based on a number of total completed transactions relating to the similar records to the record in the first subset of records.

20. The computer-readable media of claim 11:
the second transaction process comprising selecting one or more items from a digital list maintained by the supplier computer;
the recommendation data comprising a recommendation to create a digital list comprising the one or more recommended items;
the computer-readable media further comprising instructions which, when executed by one or more processors, cause creating a digital list comprising the one or more recommended items.

* * * * *